(12) United States Patent
Swett

(10) Patent No.: US 12,152,446 B1
(45) Date of Patent: Nov. 26, 2024

(54) SUPPRESSING VIBRATION DURING WELLBORE DRILLING

(71) Applicant: Saudi Arabian Oil Company, Dhahran (SA)

(72) Inventor: Dwight W. Swett, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/319,294

(22) Filed: May 17, 2023

(51) Int. Cl.
E21B 17/07 (2006.01)
B33Y 80/00 (2015.01)
E21B 47/017 (2012.01)

(52) U.S. Cl.
CPC ............ E21B 17/07 (2013.01); B33Y 80/00 (2014.12); E21B 47/017 (2020.05)

(58) Field of Classification Search
CPC ........ E21B 17/07; E21B 47/017; B33Y 80/00
See application file for complete search history.

(56) References Cited

U.S. PATENT DOCUMENTS

| 5,274,606 | A | 12/1993 | Drumheller et al. |
| 6,915,875 | B2 | 6/2005 | Dubinsky et al. |
| 7,210,555 | B2 | 5/2007 | Shah et al. |
| 7,997,380 | B2 | 8/2011 | Arian et al. |
| 8,270,251 | B2 | 9/2012 | Drumheller et al. |
| 9,418,646 | B2 | 8/2016 | Daley et al. |
| 11,282,490 | B2 | 3/2022 | Swett |
| 11,635,369 | B1 | 4/2023 | Swett |
| 11,774,289 | B2 | 10/2023 | Swett |
| 2021/0079737 | A1* | 3/2021 | Peters ................. E21B 17/042 |
| 2023/0407712 | A1* | 12/2023 | Reckmann ............ E21B 17/07 |

FOREIGN PATENT DOCUMENTS

| CN | 106567900 | 4/2017 |
| CN | 109356969 | 2/2019 |
| CN | 112049885 | 12/2020 |
| EP | 1915504 | 4/2008 |

OTHER PUBLICATIONS

Bacquet et al., "Metadamping: Dissipation Emergence in Elastic Metamaterials," Advances in Applied Mechanics, 2018, 50 pages.
Barnes et al., "Passbands in acoustic transmission in idealized drill string," Journal of the Acoustical Society of America, Nov. 1972, 51(5):1606-1608, 3 pages.
Elmadih et al., "Metamaterials for simultaneous acoustic and elastic bandgaps," Scientific Reports, Jul. 2021, 11:14635, 10 pages.

(Continued)

Primary Examiner — Dany E Akakpo
(74) Attorney, Agent, or Firm — Fish & Richardson P.C.

(57) ABSTRACT

A drill string vibration isolator includes a top connector configured to couple to a portion of a drill string; a bottom connector configured to couple to another portion of the drill string; a housing; and at least one elastic metamaterial configured to absorb mechanical energy vibrations generated through operation of a drilling rig to rotate the drill string and operation of an acoustic telemetry source to transmit downhole data to a terranean surface.

23 Claims, 13 Drawing Sheets

(56) References Cited

OTHER PUBLICATIONS

Gao et al., "Acoustic telemetry can deliver more real-time downhole data in underbalanced drilling operations," presented at the IADC/SPE Drilling Conference, Miami, Florida, Feb. 21-23, 2006, 6 pages.

Gao et al., "Elastic Wave Modulation in Hollow Metamaterial Beam With Acoustic Black Hole," IEEE Access, Feb. 2017, 7:124141-124146, 7 pages.

Hussein et al., "Metadamping: An emergent phenomenon in dissipative metamaterials," Journal of Sound and Vibration, 2013, 332:4767-4774, 11 pages.

Oh et al., "Elastic metamaterials for independent realization of negativity in density and stiffness," Scientific Reports, Mar. 2016, 6:23630, 10 pages.

Poletto, "Use of dual waves for the elimination of reverberations in drill strings," Journal of the Acoustical Society of America, Jan. 2002, 111:37-40, 4 pages.

Rector et al., "The use of drill-bit energy as a downhole seismic source," Geophysics, May 1991, 56(5):628-634, 7 pages.

Reeves et al., "High speed acoustic telemetry network enables real-time along string measurements, greatly reducing drilling risk," presented at the SPE-Offshore Europe Oil and Gas Conference and Exhibition, Aberdeen, UK, Sep. 6-8, 2011, 12 pages.

Sinanovic et al., "Directional propagation cancellation for acoustic communication along the drill string," IEEE International Conference on Acoustics, Speech and Signal Processing, May 14-19, 2006, 4 pages.

Swett, "Near Zero Index Perfect Metasurface Absorber using Inverted Conformal Mapping," Scientific Reports, 2020, 10:9731, 14 pages.

Wu et al., "Mechanical metamaterials for full-band mechanical wave shielding," Applied Materials Today, 2020, vol. 20:100671, 22 pages.

Zhu et al., "A chiral elastic metamaterial beam for broadband vibration suppression," Journal of Sound and Vibration, Feb. 2014, 333:2759-2773, 16 pages.

\* cited by examiner

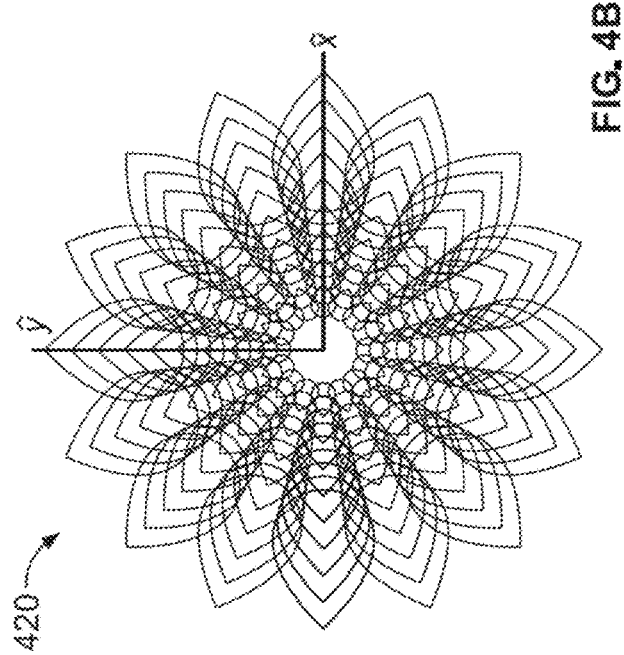
FIG. 4A
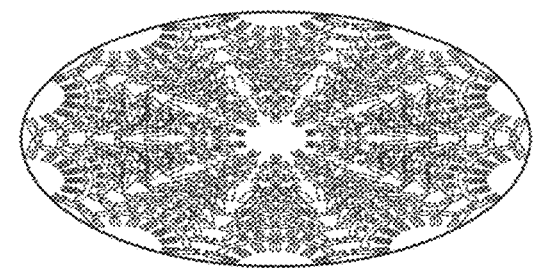
FIG. 4B
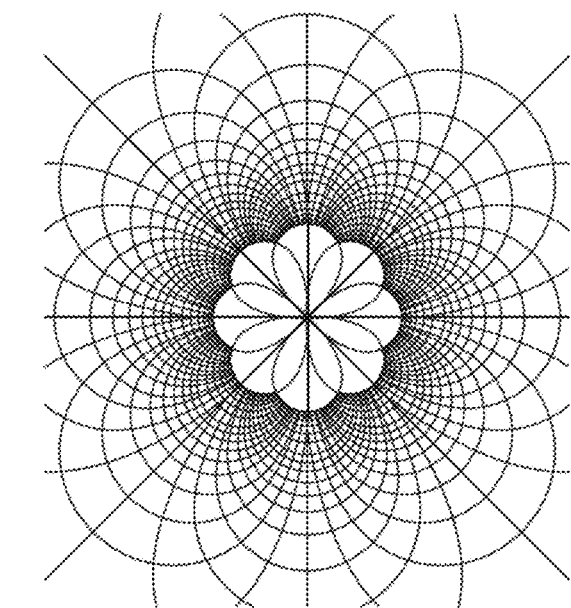
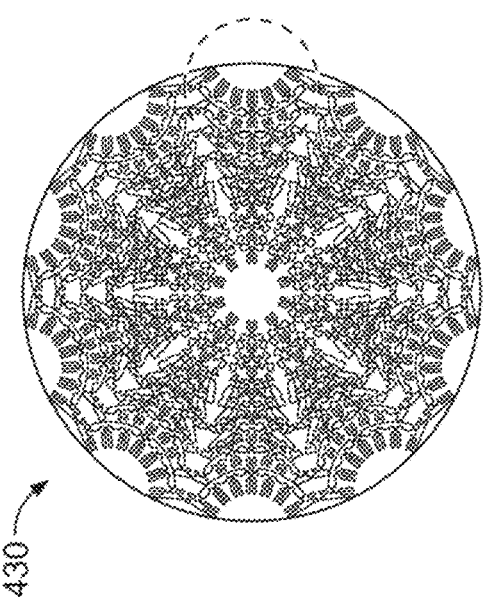
FIG. 4C

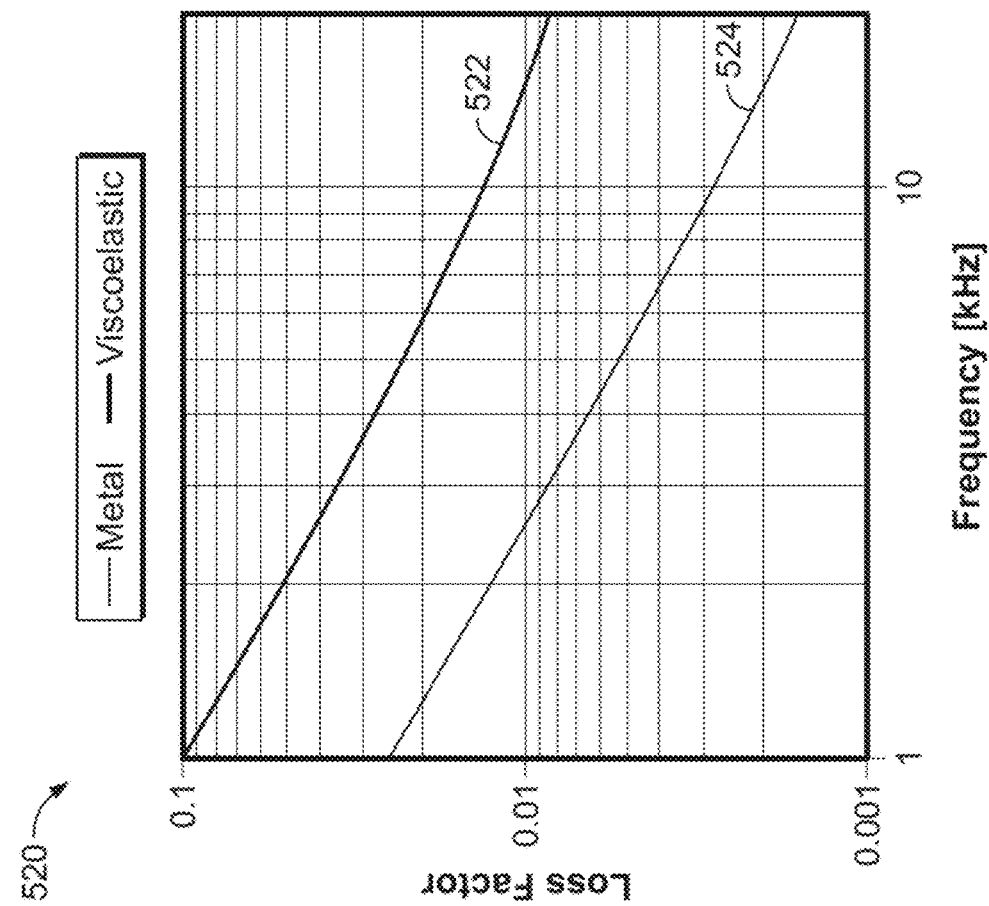
FIG. 5C
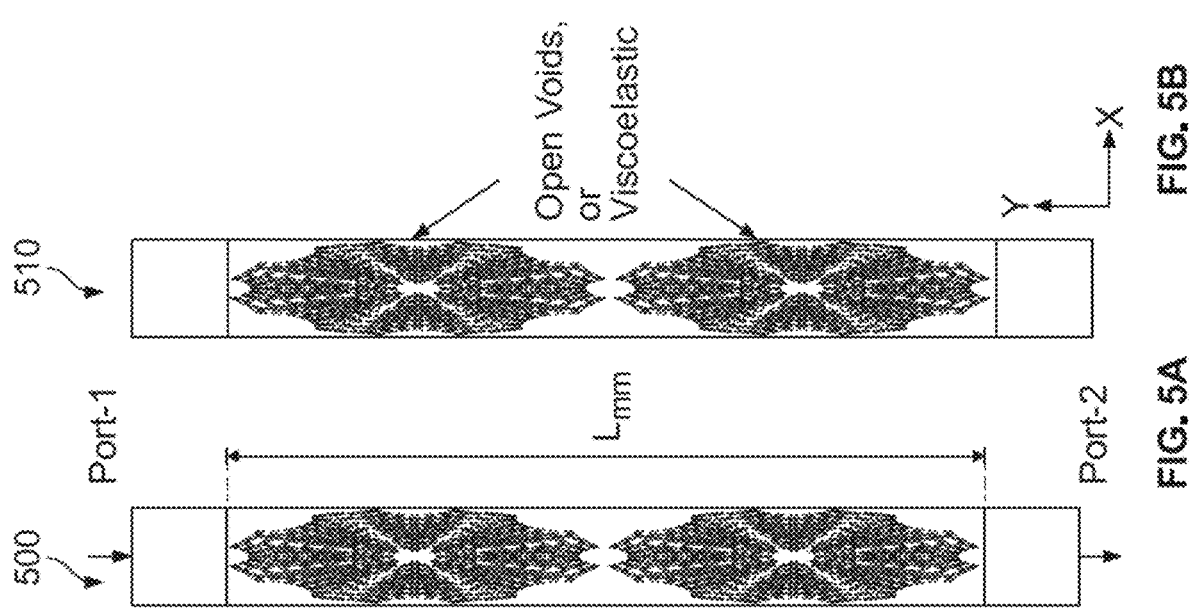
FIG. 5B
FIG. 5A

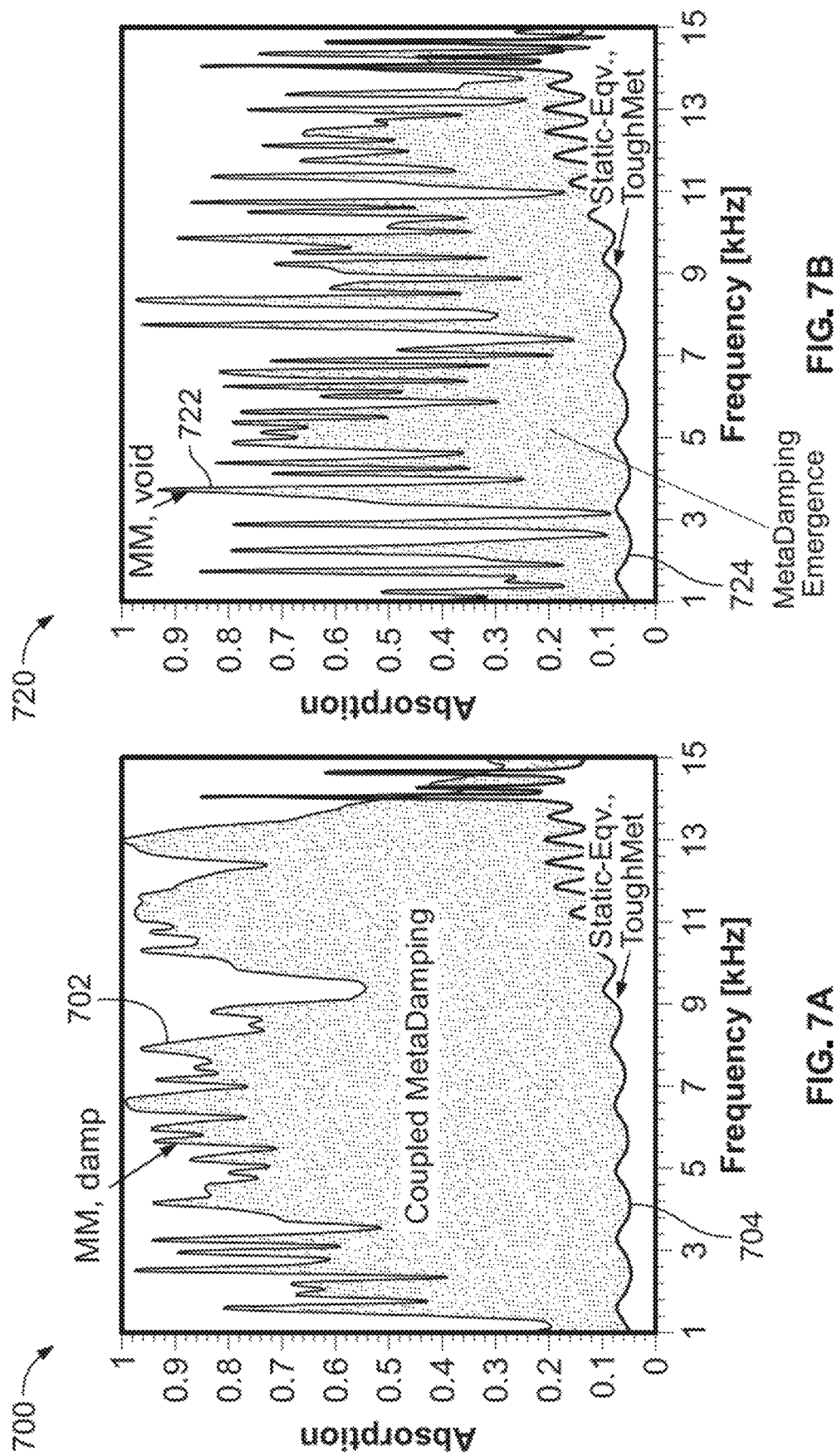

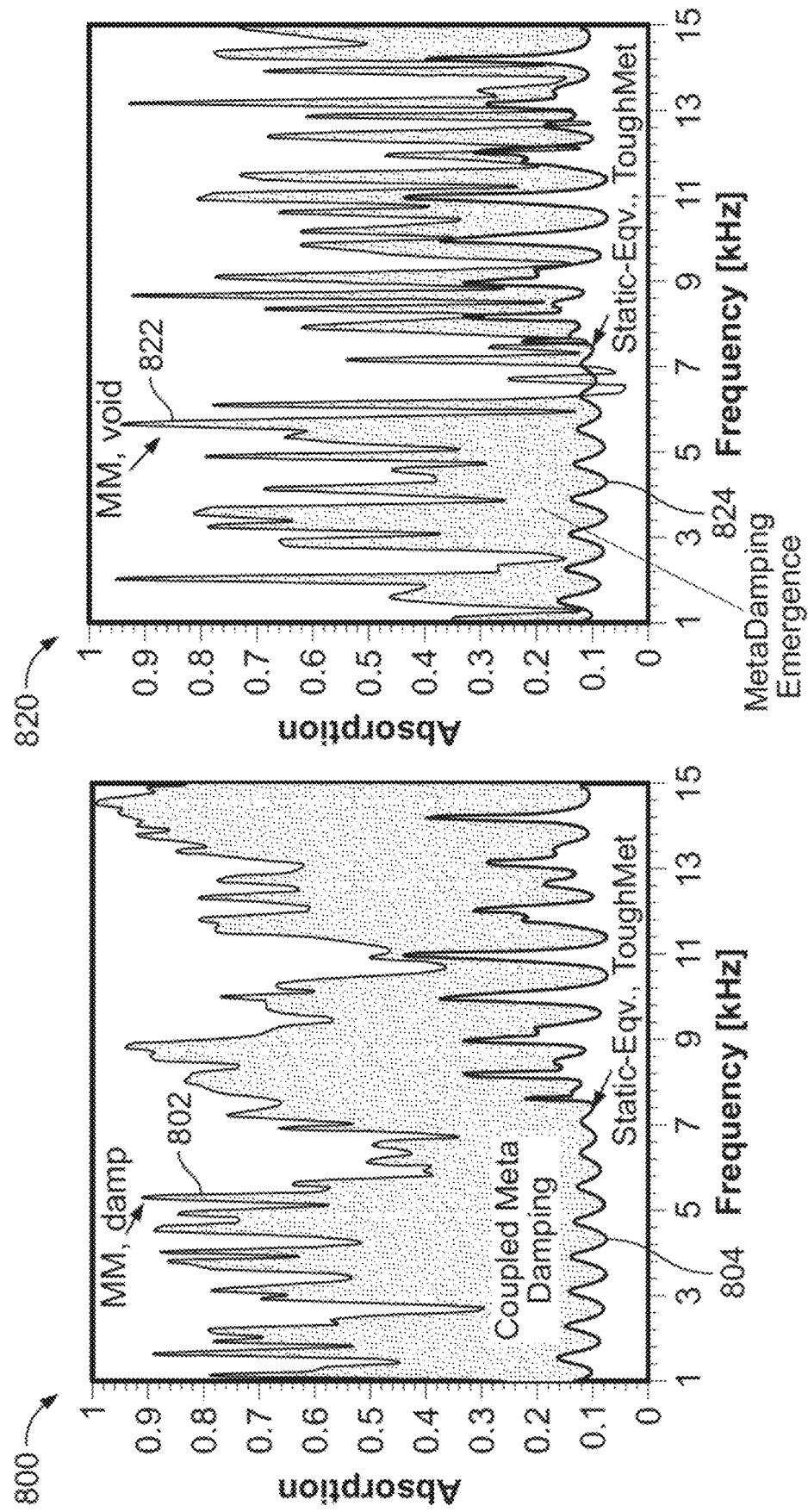

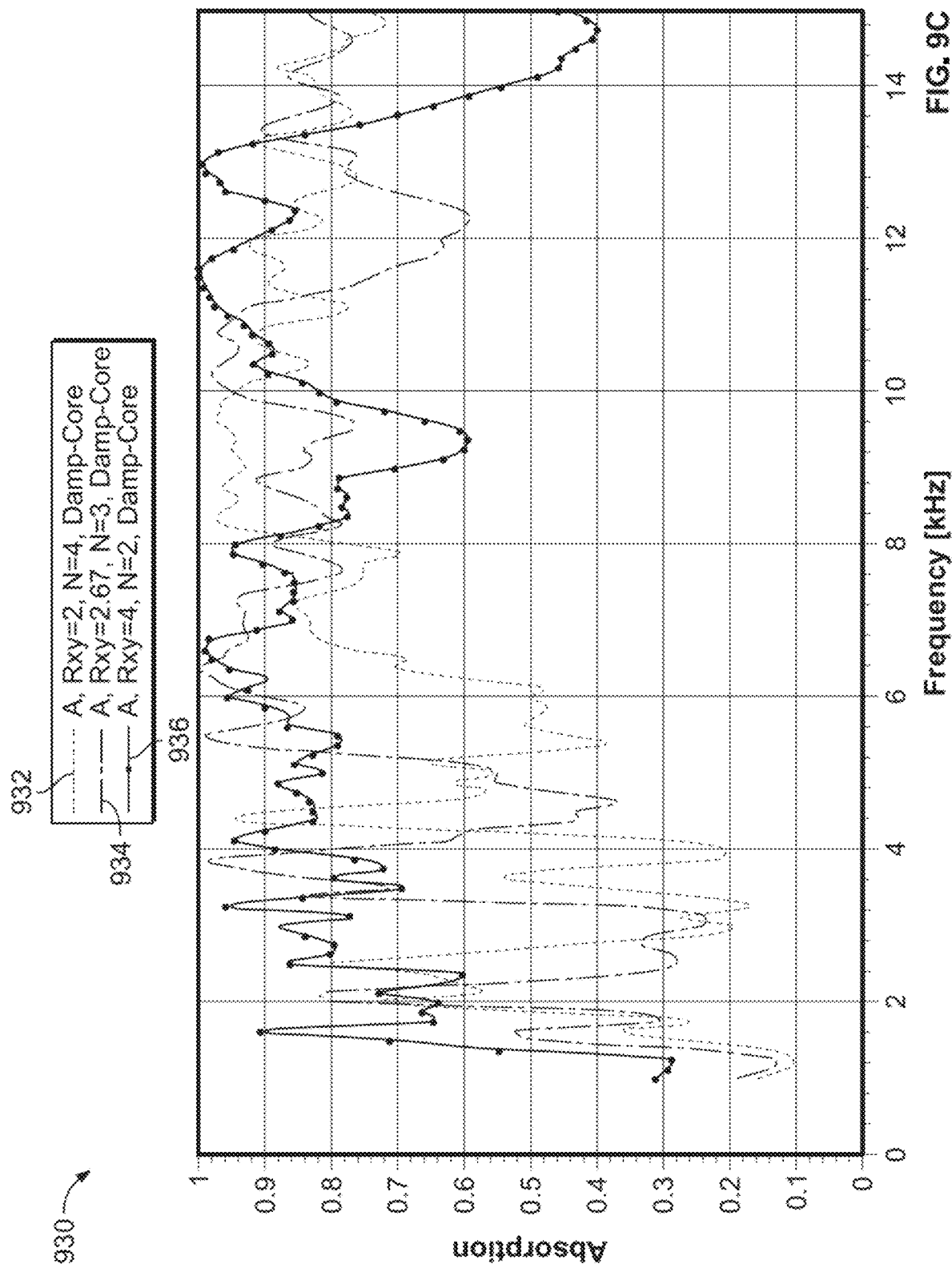

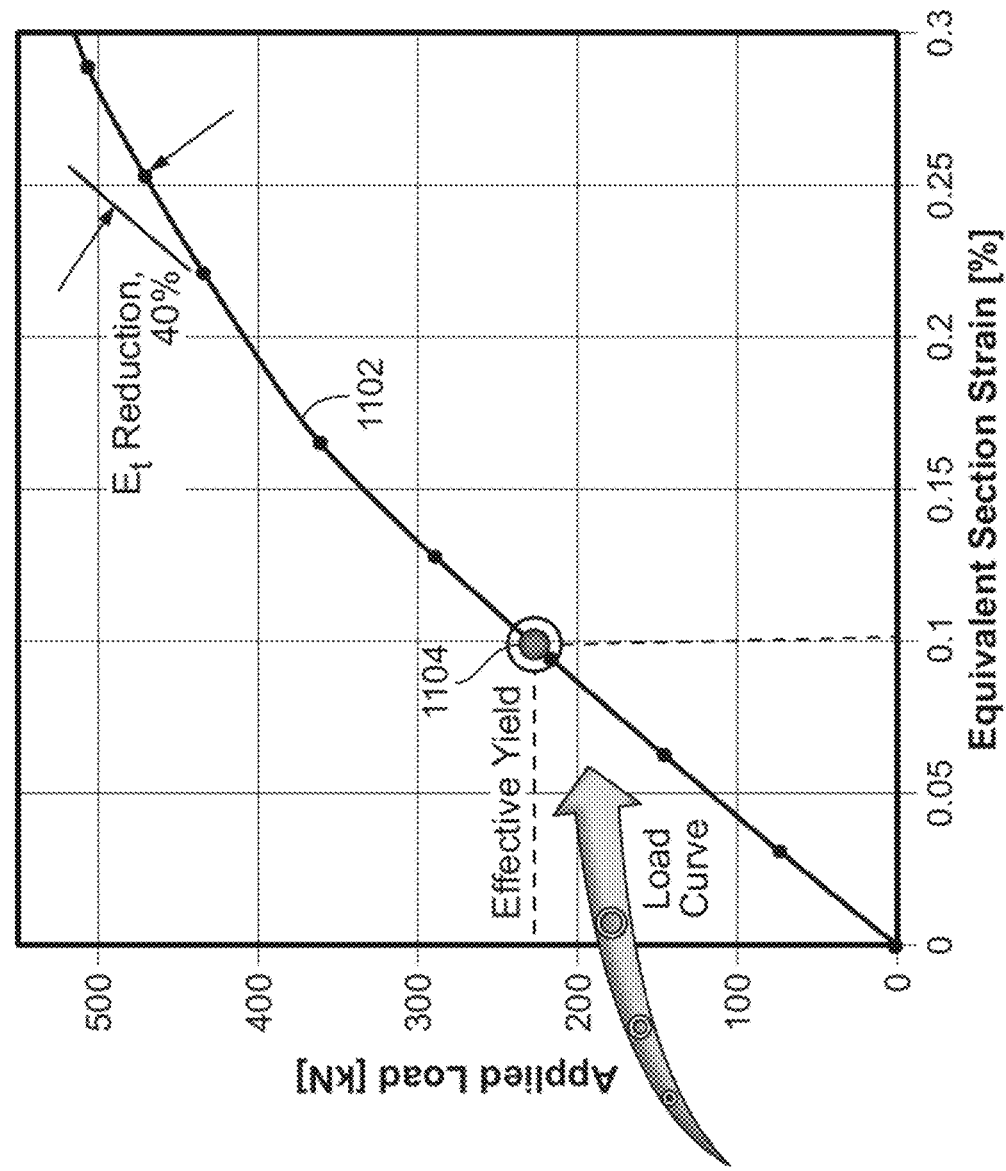
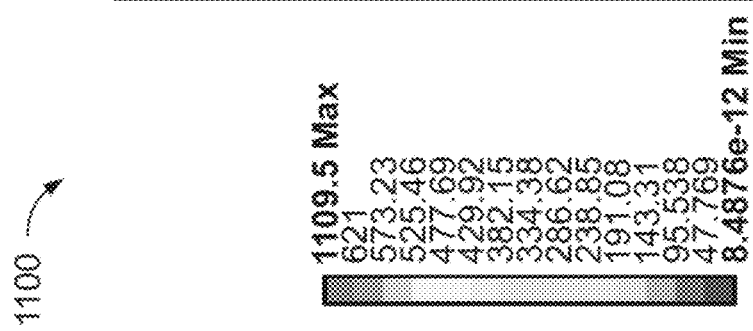
FIG. 11

SUPPRESSING VIBRATION DURING WELLBORE DRILLING

TECHNICAL FIELD

The present disclosure relates to systems and methods for reducing vibration and other undesirable acoustic noise during drilling of a wellbore into subterranean formations.

BACKGROUND

Drilling operations often increase in complexity as benefits to hydrocarbon exploration and production are identified. Downhole tool and formation information collected and delivered in real time to the drilling operator to promote proper implementation of the drilling can be important. Such information, if transmitted to the surface, can be used to optimize the drilling operation by adjusting the direction of drilling and to understand downhole formation conditions in real time.

Certain drilling operations occur as underbalanced drilling (UBD) operations. UBD delivers several benefits to the drilling and production phases, including increased rate of penetration (ROP), less difficult stuck pipe situations, and reduced wellbore wall damage, which benefits the production phase as well as control of lost circulation during the drilling process. These effects contribute to enhancing the ability of the operator to develop depleted and marginal reservoirs and fields. The benefits of UDB, however, come at the expense of increased complexity in the drilling process relative to conventional drilling which makes real-time high data rate telemetry an even more critical technology to the drilling operator. Achieving reasonable telemetry data rates for logging-while-drilling (LWD) and measurement-while-drilling (MWD) during these types of scenarios however can be problematic with current telemetry techniques.

SUMMARY

In an example implementation, a wellbore drilling system includes a drill string coupled to a drilling rig and including a plurality of drill pipe joints; a bottom hole assembly (BHA) coupled to the drill string and including a drill bit configured to form a wellbore from a terranean surface into one or more subterranean formations through operation of the drilling rig to rotate the drill string and BHA; and a vibration isolator coupled within the drill string between the BHA and an acoustic telemetry source. The vibration isolator includes an elastic metamaterial configured to absorb mechanical energy vibrations generated through operation of the drilling rig to rotate the drill string and BHA.

In an aspect combinable with the example implementation, the elastic metamaterial is formed in a specified geometry that includes a plurality of voids.

In another aspect combinable with any of the previous aspects, the vibration isolator further includes a viscoelastic material that fills at least some of the plurality of voids.

In another aspect combinable with any of the previous aspects, the elastic metamaterial is formed in the specified geometry with an additive manufacturing process.

In another aspect combinable with any of the previous aspects, the specified geometry is based on a transformation of a set of Rhodonea conformal mapping contours.

In another aspect combinable with any of the previous aspects, the elastic metamaterial includes at least one of ToughMet-2-CX, SLM Inconel-718, or SLM Ti6A14V.

In another aspect combinable with any of the previous aspects, the mechanical energy vibrations include a first portion of mechanical energy vibrations generated from the drill bit that propagate in an uphole direction; and a second portion of mechanical energy vibrations generated from the acoustic telemetry source that propagate in a downhole direction.

In another example implementation, a method of forming a wellbore includes operating a wellbore drilling system to form a wellbore from a terranean surface into one or more subterranean formations. The operating includes operating a drilling rig on the terranean surface to rotate a drill string coupled to the drilling rig and including a plurality of drill pipe joints, and rotating a drill bit of a bottom hole assembly (BHA) coupled to the drill string to form the wellbore; and during operation of the wellbore drilling system, absorbing mechanical energy vibrations generated through operation of the drilling rig to rotate the drill string and BHA with an elastic metamaterial of a vibration isolator coupled within the drill string between the BHA and an acoustic telemetry source.

In an aspect combinable with the example implementation, the elastic metamaterial is formed in a specified geometry that includes a plurality of voids.

In another aspect combinable with any of the previous aspects, the vibration isolator further includes a viscoelastic material that fills at least some of the plurality of voids.

In another aspect combinable with any of the previous aspects, the elastic metamaterial is formed in the specified geometry with an additive manufacturing process.

In another aspect combinable with any of the previous aspects, the specified geometry is based on a transformation of a set of Rhodonea conformal mapping contours.

In another aspect combinable with any of the previous aspects, the elastic metamaterial includes at least one of ToughMet-2-CX, SLM Inconel-718, or SLM Ti6A14V.

Another aspect combinable with any of the previous aspects includes, by operation of the wellbore drilling system, generating a first portion of mechanical energy vibrations from the drill bit that propagate in an uphole direction; absorbing at least some of the first portion of mechanical energy vibrations with the elastic metamaterial; by operation of the wellbore drilling system, generating a second portion of mechanical energy vibrations from the acoustic telemetry source that propagate in a downhole direction; and absorbing at least some of the second portion of mechanical energy vibrations with the elastic metamaterial.

Another aspect combinable with any of the previous aspects includes dissipating at least some of the absorbed first and second portions of mechanical energy vibrations as heat.

In another example implementation, a drill string vibration isolator includes a top connector configured to couple to a portion of a drill string; a bottom connector configured to couple to another portion of the drill string; a housing; and at least one elastic metamaterial configured to absorb mechanical energy vibrations generated through operation of a drilling rig to rotate the drill string and operation of an acoustic telemetry source to transmit downhole data to a terranean surface.

In an aspect combinable with the example implementation, the at least one elastic metamaterial is formed in a specified geometry that includes a plurality of voids.

In another aspect combinable with any of the previous aspects, the vibration isolator further includes a viscoelastic material that fills at least some of the plurality of voids.

In another aspect combinable with any of the previous aspects, the elastic metamaterial is formed in the specified geometry with an additive manufacturing process.

In another aspect combinable with any of the previous aspects, the specified geometry is based on a transformation of a set of Rhodonea conformal mapping contours.

In another aspect combinable with any of the previous aspects, the at least one elastic metamaterial includes at least one of ToughMet-2-CX, SLM Inconel-718, or SLM Ti6Al4V.

In another aspect combinable with any of the previous aspects, the mechanical energy vibrations include a first portion of mechanical energy vibrations generated from the drill bit that propagate in an uphole direction; and a second portion of mechanical energy vibrations generated from an acoustic telemetry source coupled to the drill string that propagate in a downhole direction.

In another aspect combinable with any of the previous aspects, the vibration isolator is configured to couple within the drill string between the drill bit and the acoustic telemetry source.

Implementations according to the present disclosure may include one or more of the following features. For example, implementations of a vibration isolator according to the present disclosure can be insensitive to bottom hole assembly and drill string configurations. Implementations of a vibration isolator according to the present disclosure can also exhibit broadband vibration suppression (i.e., absorption of the mechanical vibrational energy) in order to both isolate drilling noise as well as absorb a downward transmitted source wave directed towards the drill bit that may lead to secondary contamination on the telemetry signal due to reflected vibrations. As another example, implementations of a vibration isolator according to the present disclosure can include an elastic metamaterial based on a conformal mapping geometry that shows nearly perfect vibrational energy absorption over a broad frequency bandwidth. As another example, implementations of a vibration isolator according to the present disclosure maintain incumbent load bearing capacity for downhole applications simultaneously with near perfect vibrational energy absorption.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIGS. 4A-4C are graphical representations of geometric inversions for a metamaterial structure from which at least a portion of a vibration isolator can be formed according to the present disclosure.

FIGS. 5A and 5B represent simulation models of a metamaterial structure from which a vibration isolator can be formed according to the present disclosure.

FIG. 5C is a graph that illustrates a frequency dependent loss factor for the simulation model of FIG. 5B.

FIGS. 7A and 7B are graphs that show comparisons of vibrational energy absorption for axial loading of a uniform prismatic bar with the metamaterial having viscoelastic filling in the cellular voids and with no material in the voids, that forms at least a portion of a vibration isolator according to the present disclosure.

FIGS. 8A and 8B are graphs that show comparisons of vibrational energy absorption for transverse loading of a uniform prismatic bar with the metamaterial having viscoelastic filling in the cellular voids and with no material in the voids, that forms at least a portion of a vibration isolator according to the present disclosure.

FIGS. 9A-9C are graphs that illustrate scattering parameters retrieval spectra for a particular metamaterial with viscoelastic filled voids for different anisotropy factors according to the present disclosure.

FIG. 11 shows a graph of a load-strain response of a particular metamaterial that can be used to form at least a portion of a vibration isolator according to the present disclosure.

DETAILED DESCRIPTION

Figure 1:
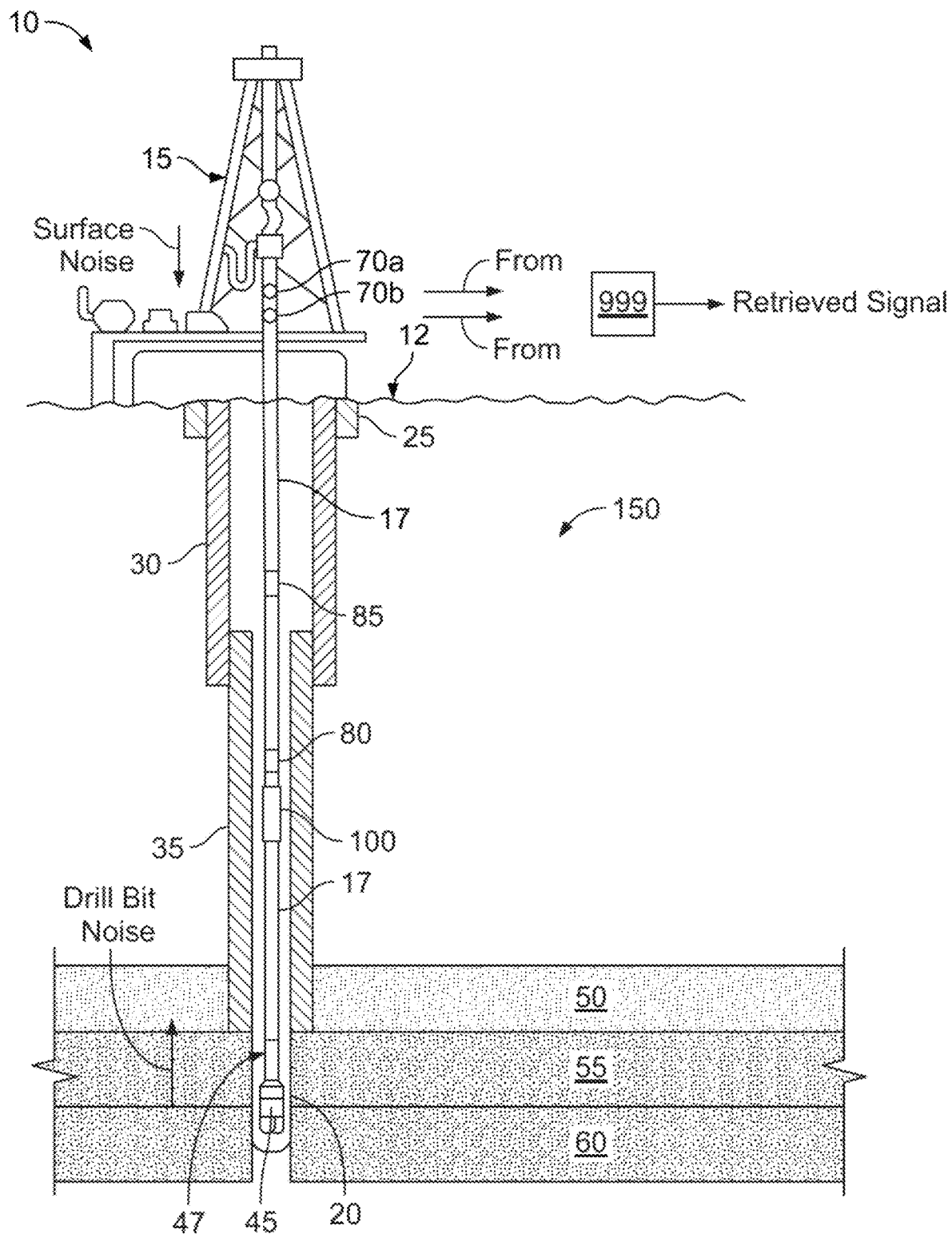
FIG. 1 illustrates an example implementation of a wellbore drilling system that includes an acoustic telemetry system and a vibration isolator as part of a drill string according to the present disclosure.

FIG. 1 illustrates an example implementation of a wellbore drilling system 10 that includes an acoustic telemetry system 150 and a vibration isolator 100 as part of a drill string according to the present disclosure. The acoustic telemetry system 150 illustrated in FIG. 1 can include an acoustic transmitter 80 that is part of a drill string 17, as well as one or more acoustic receivers 70a and 70b and an acoustic echo canceller 999. A number of acoustic sources confront and comprise the acoustic telemetry system 150, including, for instance, a drilling rig 15 that generates surface noise that travels downhole on the drill string 17, a drill bit 45 as part of a bottom hole assembly (BHA) 47 that generates drill bit noise that travels uphole through the drill string 17, and the acoustic transmitter 80.

Generally, acoustic telemetry is one of several telemetry methods available for measurement-while-drilling (MWD) and logging-while-drilling (LWD) tools, which primarily include mud pulse telemetry, extremely low-frequency electromagnetic (EM) telemetry, high-speed wired pipe telemetry, and drill string acoustic telemetry. Mud pulse telemetry has been the most widely applied method but data transmission rate is limited to a few bits per second (bps) due to attenuation and dispersion of the acoustic propagation in the fluid column. In under balanced drilling (UBD) operations, gas is injected in a fluid column to decrease density and increase compressibility, but this can render mud pulse telemetry ineffective. EM telemetry can encounter high attenuation in formations with low electrical resistivity, as well as in highly conductive wellbore fluids and in cased holes, which make it impractical for a significant portion of operational scenarios. High-speed wired pipe telemetry requires a sophisticated system of wired drill pipe and associated drilling tools connecting the MWD string to the surface which substantially increases the cost of the drilling operation. The data transmission along the drill string via elastic stress waves (acoustic telemetry) offers another communication possibility.

Acoustic telemetry can be advantageous in that it includes a potentially high data rate (compared to the other forms of telemetry) virtually independent of formation and wellbore fluid properties. Mud pulse and EM telemetry are both rate-limited due to their low carrier frequencies. Mud pulse carrier frequency is typically below 100 Hz, while EM telemetry operates at lower than 30 Hz. In contrast, the operating frequency band of acoustic telemetry system 150 can be much higher and broader, ranging from 400 Hz to 2 KHz. Thus, it is possible for the acoustic telemetry system 150 to operate at significantly higher telemetry rates.

As shown in FIG. 1, the acoustic telemetry system 150 is part of the wellbore drilling system 10. As shown, the wellbore drilling system 10 accesses one or more subterranean formations 50, 55, and 60 to produce hydrocarbons located in such subterranean formations. As illustrated in FIG. 1, the wellbore drilling system 10 includes a drilling assembly 15 deployed on a terranean surface 12. The drilling assembly 15 may be used to form a wellbore portion 20 extending from the terranean surface 12 and through one or more geological formations (including formations 50, 55, and 60) in the Earth. As will be explained in more detail, one or more wellbore casings, such as a surface casing 30 and intermediate casing 35, may be installed in at least a portion of the wellbore portion 20.

In some embodiments, the drilling assembly 15 may be deployed on a body of water rather than the terranean surface 12. For instance, in some embodiments, the terranean surface 12 may be below an ocean, gulf, sea, or any other body of water under which hydrocarbon-bearing formations may be found. In short, reference to the terranean surface 12 includes both land and underwater surfaces and contemplates forming or developing one or more wellbores from either or both locations.

Generally, the drilling assembly 15 can be any appropriate assembly or drilling rig used to form wellbores or boreholes in the Earth. The drilling assembly 15 can use traditional techniques to form such wellbores, such as the wellbore portion 20, or can use nontraditional or novel techniques. In some embodiments, the drilling assembly 15 can use rotary drilling equipment to form such wellbores. Rotary drilling equipment is known and can consist of a drill string 17 and the BHA 47. In some embodiments, the drilling assembly 15 can consist of a rotary drilling rig. Rotating equipment on such a rotary drilling rig can consist of components that serve to rotate a drill bit, which in turn forms a wellbore, such as the vertical wellbore portion 20, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 17. The drill string 17 is typically attached to the drill bit within the BHA 47. A swivel, which is attached to hoisting equipment, carries much, if not all of, the weight of the drill string 17, but can allow it to rotate freely.

The drill string 17 typically consists of sections of heavy steel pipe, which are threaded so that they can interlock together. Downhole of the drill pipe are one or more drill collars, which are heavier, thicker, and stronger than the drill pipe. The threaded drill collars help to add weight to the drill string 17 uphole of the drill bit to ensure that there is enough downward pressure on the drill bit to allow the bit to drill through the one or more geological formations. The number and nature of the drill collars on any particular rotary rig can be altered depending on the downhole conditions experienced while drilling.

The drill bit 45 is typically located within or attached to the BHA 47, which is located at a downhole end of the drill string 17. The drill bit is primarily responsible for making contact with the material (for example, rock) within the one or more geological formations and drilling through such material. According to the present disclosure, a drill bit type can be chosen depending on the type of geological formation encountered while drilling. The circulating system of a rotary drilling operation, such as the drilling assembly 15, can be an additional component of the drilling assembly 15. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. In some embodiments, such as, for example, during a horizontal or directional drilling process, downhole motors can be used in conjunction with or in the BHA 47. Such a downhole motor can be a mud motor with a turbine arrangement, or a progressive cavity arrangement, such as a Moineau motor. These motors receive the drilling fluid through the drill string 17 and rotate to drive the drill bit or change directions in the drilling operation.

As illustrated in FIG. 1, the BHA 47, including the drill bit 45, drills or creates the vertical wellbore portion 20, which extends from the terranean surface 12 towards the subterranean formations 50, 55, and 60. In some embodiments of the wellbore drilling system 10, the vertical wellbore portion 20 can be cased with one or more casings. As illustrated, the vertical wellbore portion 20 includes a conductor casing 25, which extends from the terranean surface 12 shortly into the Earth. A portion of the vertical wellbore portion 20 enclosed by the conductor casing 25 can be a large diameter borehole. Downhole of the conductor casing 25 can be the surface casing 30. The surface casing 30 can enclose a slightly smaller borehole and protect the vertical wellbore portion 20 from intrusion of, for example, freshwater aquifers located near the terranean surface 12.

Although illustrated as vertical, the wellbore portion 20 can be offset from vertical (for example, a slant wellbore), a directional wellbore, a horizontal wellbore, or combinations of several of these types of wellbore. For example, the wellbore portion 20 can be a stepped wellbore, such that a portion is drilled vertically downward and then curved to a horizontal wellbore portion. The horizontal wellbore portion can then be turned downward to a second substantially vertical portion, which is then turned to a second substantially horizontal wellbore portion. Additional vertical and horizontal wellbore portions can be added according to, for example, the type of terranean surface 12, the depth of one or more target subterranean formations, or the depth of one or more productive subterranean formations, or a combination of both.

Other components are illustrated within the drill string 17, including the acoustic transmitter 80 (as a telemetry source), a tool joint 85, and the vibration isolator 100. An issue with acoustic telemetry, is, however, that ongoing drill bit operations tend to generate wide bandwidth noise which contaminates the telemetry data transmission channel of the acoustic transmitter 80. At least one source of such contaminating noise is associated with the operation of the drill bit 45 at the end of the BHA 47, which generates high amplitude upward propagating vibration (as shown with the drill bit noise) that interferes with the transmitted upward propagating acoustic telemetry data.

In addition, the surface mechanical equipment of the drilling rig 15, including the top drive coupled to the drill string 17, can generate downward propagating noise (as shown) that also interferes with the uplink acoustic telemetry data. Further, variable frequency reverberations due to reflections from pipe joints and the formation wall impact can generate interference noise as well. The telemetry source (acoustic transmitter 80) can be a significant source of contaminating interference as well, due to the reflections of vibrational energy directed away from the source downward to the BHA 47. These different sources of noise strongly deteriorate the signal-to-noise ratio (SNR) of the received telemetry data (at acoustic receivers 70a and 70b) at the surface 12, which can make the data difficult to identify and analyze.

Figure 2:
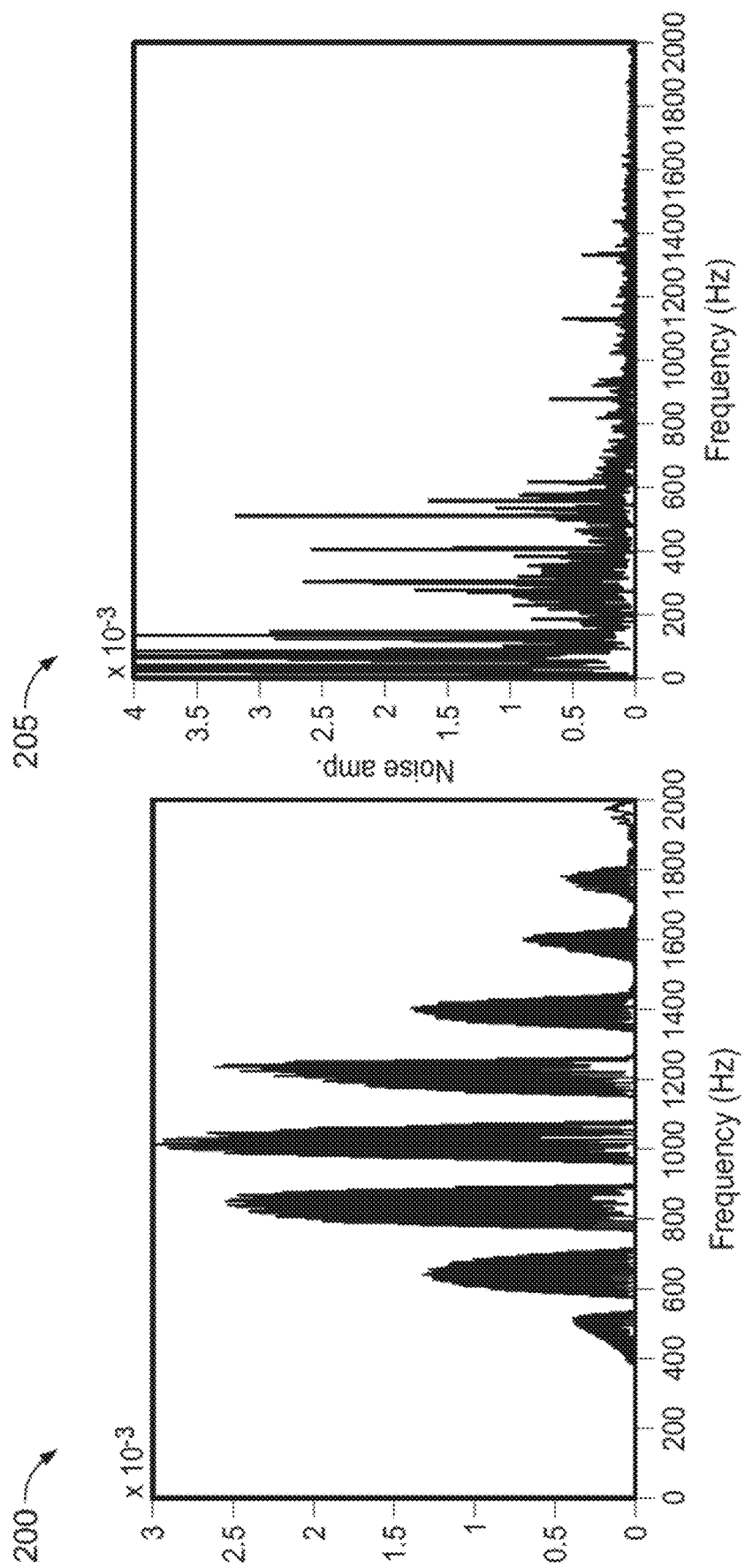
FIGS. 2A and 2B are graphs that illustrate typical drill string vibration pass band characteristics.

Turning to FIGS. 2A and 2B, these figures include graphs 200 and 205, respectively, that illustrate drill string vibration pass band characteristics. The transmission characteristics of elastic stress waves in a drill string (for example, drill string 17) exhibit a banded and dispersive response, often investigated theoretically with an idealized drill string model and measured in downhole drilling operations. Graph 200 includes a y-axis of noise amplitude and an x-axis of frequency for an example of measured noise in a downhole drilling operation of a 4000 ft. vertical wellbore. Graph 205 includes a y-axis of noise amplitude and an x-axis of frequency for power spectral density of the noise data collected on the drill string at the surface of this wellbore. Here, note the passbands H(f)>0 and stopbands H(f)=0.

In some aspects, the vibration isolator 100 can be installed (for example, threadingly) in the drill string 17 to suppress and/or absorb undesirable vibrational energy, and dissipate the suppressed/absorbed energy as heat in the wellbore. Generally, vibration isolator 100 includes a top connection (for example, top sub-assembly) 101 that couples (for example, threadingly) to the drill string 17 at one (uphole) end, and a bottom connection (for example, bottom sub-assembly) 103 that couples (for example, threadingly) to the drill string 17 at another (downhole) end. A housing 105 encloses or contains an elastic metamaterial 107.

Several mechanical designs for conventional acoustic isolators have been proposed and implemented to attenuate the noise from a drill bit in order to minimize the impacts on acoustic wave transmission in the drill string. Typically, a conventional isolator is designed using variable geometry notches in a pipe cross-section, or multi-material stacks of different mass density, to be compatible with one or more of the passbands intrinsic to the drill string, with the telemetry system designed around this passband and the acoustic isolation. These conventional devices work on the reflection mode of attenuation and as a consequence have minimal effect on the contamination due to reflection of the downward propagating wave from the telemetry source. This reflection mode may develop a "detuned" isolation situation in which in the extreme case complete signal loss results due to reflective destructive interference with the upward propagating telemetry signal.

Further, mechanical schemes have been proposed without analytical or experimental substantiation suggesting acoustic impedance tuning of a conventional isolator can be used to eliminate the reflection contamination effects. However, the basic physics of these reflection mode isolator devices make "tuning" compensation for the general intrinsic vibration contamination spectra improbable for actual drilling operations.

In light of existing vibration attenuation ineffective solutions, vibration isolator 100 can be installed in the drill string 17 independent of various BHA and drill string configurations. The vibration isolator 100 can exhibit broadband vibration suppression (i.e., absorption of the mechanical vibrational energy) in order to both isolate the BHA drilling noise as well as absorb the downward transmitted source wave directed towards the BHA 47 that results in reflective interference with the upward propagating telemetry signal. The example implementation of the vibration isolator 100 can reduce or eliminate a potential for destructive interference due to unforeseen differences or changes in the downhole configuration. Such example implementations can include a vibration isolator 100 that includes an elastic metamaterial 107 cell based on a different conformal mapping geometry, which shows advantageous vibrational energy absorption over a broad frequency bandwidth. In particular, implementations of the vibration isolator 100 do not include an elastomeric damping material, which while potentially enhancing the absorption of vibration in certain frequency ranges, can actually deteriorate the absorption in certain other frequencies.

The example implementations of the vibration isolator 100 can overcome challenges in conventional structural design, which is that damping remains predominantly an intrinsic property of a material selected for the isolator, with vibration control normally addressed through separate treatments integrated auxiliary to the primary structure of a vibration isolator for a drill string. The primary structure material selection is then based on mechanical properties that satisfy specifications for load capacity, fatigue endurance, and environmental compatibility where vibration control many times is balanced against these specifications. This stiffness-damping trade-off exists due to the mutually exclusive nature of damping and modulus of elasticity in natural materials.

Figure 3:
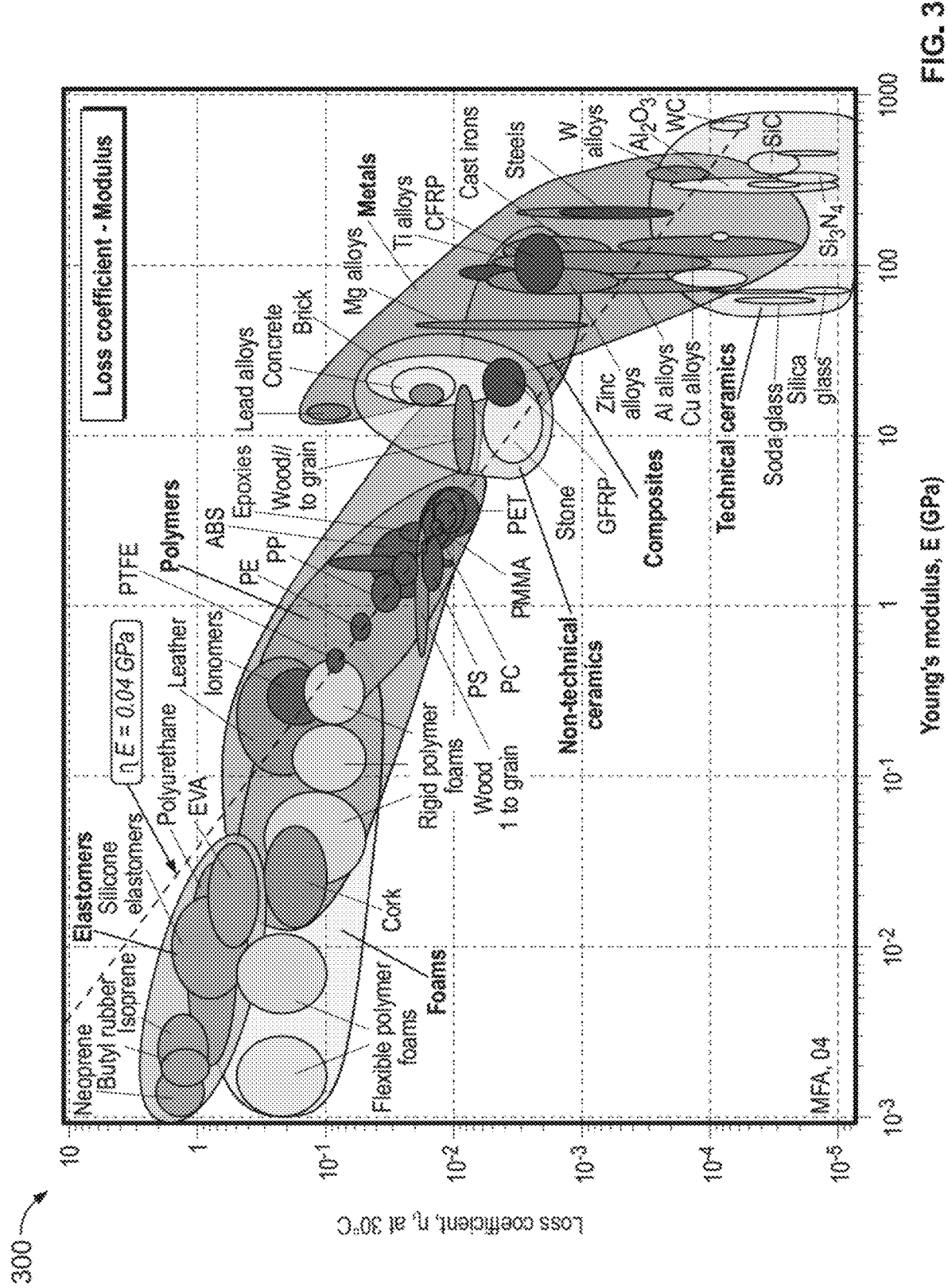
FIG. 3 is a graph that illustrates property trade-offs in damping vs. stiffness for materials from which a vibration isolator in a drill string can be formed.

For example, as shown in FIG. 3, graph 300 is an Ashby chart that illustrates property trade-offs in damping vs. stiffness for materials from which a vibration isolator in a drill string can be formed. Graph 300 highlights the inverse relationship between damping and stiffness for many common materials, such as elastomers, foams, polymers, non-technical ceramics, composites, metals, and technical ceramics.

With this relationship in mind, example implementations of the vibration isolator 100 can include or be formed of one or more elastic metamaterials 107. Elastic metamaterials 107 are solid structures that derive effective material properties from the elastodynamic interaction of propagating waves and subwavelength resonating geometric features. As compared to application of elastic metamaterials outside of use as a vibration isolator in a drill string, such downhole applications can have high load bearing requirements placed on vibration isolator 100 due to operational shock and vibration, and fishing/re-entry procedures. Thus, vibration isolator 100 can enable very high levels of energy absorption while still maintaining load-bearing capacity (relative to non-downhole applications). This type damping phenomenon emergent from otherwise structurally stiff components has been described as "metadamping," in contrast to narrowband phenomena that can be found in flexible structures.

Example implementations of a "metadamping" vibration isolator 100 includes an elastic metamaterial 107 that suppresses vibration by absorbing the mechanical energy over the characteristic passbands frequency range (for example, 500-2000 Hz) of the drill pipe 17. Thus, vibration isolator 100 can enable significant flexibility in the design and operation of acoustic telemetry system 150, as well as in situ adaptations to a range of BHA and drill string configurations (not just that shown in FIG. 1).

An example geometry of the elastic metamaterial 107 of the vibration isolator 100 can be based upon transformation of a set of Rhodonea conformal mapping contours that can provide for improved to perfect energy absorption of incident electromagnetic radiation in ultrathin metasurfaces. A similar approach directed towards elastic solids determined a geometry of the elastic metamaterial 107 of the vibration isolator 100 that leads to perfect elastic energy absorption in solids over multiple broad bandwidths from 0.5-2 kHz. The geometry derivation first considers the conformal mapping from Cartesian coordinate space to a new virtual domain described by the relations:

$$x = \frac{1}{\rho}\sqrt{\rho + u},$$ Eq. 1

$$y = \frac{1}{\rho}\sqrt{\rho - u}, \text{ and}$$ Eq. 2

$$\rho = \sqrt{u^2 + v^2}.$$ Eq. 3

The virtual domain is shown as image 400 in FIG. 4A. From the new virtual domain shown as image 400, a geometric inversion of the conformal contours can be accomplished using the relations:

$$\hat{x} = \frac{1}{\rho}\sqrt{\rho + u} - \sqrt{\frac{8}{u}}, \text{ and}$$ Eq. 4

$$\hat{y} = \frac{1}{\rho}\sqrt{\rho - u}.$$ Eq. 5

This geometry transformation gives a new set of non-conformal contours that "invert" the original Rhodonea conformal mapping geometry from inside-out as illustrated in the image 420 shown in FIG. 4B, into a tear-drop-type set of truncated contours. A graphical illustration of the resulting metamaterial cell geometry is shown as image 430 of FIG. 4C, with a detail of an anisotropic scaling depicted in image 440 in FIG. 4C.

In example implementations of the vibration isolator 100, the elastic metamaterial 107 is integrated as an array of voids 109 within a parent solid material having a geometry based on image 440 shown in FIG. 4C. The geometry of image 440 was investigated through finite element analysis to characterize the energy absorption properties for various geometric anisotropy factors Rxy and parent material properties using retrieval of the scattering parameters. The scattering parameters were extracted from 3D solid mechanics simulations using the commercially available Comsol® MultiPhysics 5.6 finite element analysis software package.

For the general two-port scattering simulation (with reference to the simulation model 500 shown in FIG. 5A with an uphole "port" of Port 1 and a downhole "port" of Port 2), the elastic wave propagation S matrix is defined as:

$$S = \begin{bmatrix} S_{11} & S_{12} \\ S_{21} & S_{22} \end{bmatrix}.$$ Eq. 6 in which $S_{11}$ is the propagating wave reflection parameter at Port 1, $S_{21}$ is transmission parameter due to propagation from Port 1 to Port 2, $S_{12}$ is transmission parameter due to propagation from Port 2 to Port 1, and $S_{22}$ is reflection parameter at Port 2. The time average power reflection/transmission coefficients are obtained as $|S_{ij}|^2$. Accordingly the elastic energy absorption spectrum can be calculated using:

$$A = 1 - [|S_{11}|^2 + |S_{21}|^2]$$ Eq. 7.

The scattering parameters simulation model utilized in the simulations is described in FIGS. 5A and 5B. The simulation model 500 is an elastic scattering parameters retrieval finite element model. The simulation model 510 of FIG. 5B represents an elastic metamaterial solid prismatic bar with voids embedded through the bar perpendicular to the incident wave direction. The effects of different number of instances of the cell geometry were considered as a trade study based upon varying the anisotropy factor Rxy but with a constant overall attenuation length, L (mm). In some aspects, the voids were modeled as empty spaces; in other aspects, a viscoelastic material was formed in the voids.

The maximum element size in the simulation mesh is approximately λ/300 in order to accurately capture the details of the cellular geometry. Separate simulations were performed for each of axial (Y-axis) and transverse (X-axis) (as shown in FIG. 5B) wave mode excitations at Port 1. Intrinsic material damping was modeled as frequency dependent isotropic loss factor as shown in graph 520 of FIG. 5C for the elastic metamaterial and viscoelastic materials considered. Curve 524 in graph 520 (in which y-axis is loss factor and x-axis is noise frequency) represents the loss factor of the elastic metamaterial while curve 522 represents the loss factor of the viscoelastic material within the voids (when used).

The mechanical properties for example parent solid materials that may be utilized for the elastic metamaterials (rows 2-4) and the viscoelastic material (row 5) are summarized in Table 1.

TABLE 1

| Material | Elastic Modulus (GPa) | Density (g/cc) | Poisson's Ratio |
|---|---|---|---|
| ToughMet-2-CX | 110 | 8.91 | 0.3 |
| SLM Inconel-718 | 205 | 8.19 | 0.28 |
| SLM Ti6Al4V | 116 | 4.43 | 0.33 |
| Viscoelastic | 10 | 8 | 0.4 |

The results of the finite element analysis are as follows. The frequency dispersion characteristics of the elastic metamaterial were analyzed for a conventional downhole material, ToughMet 2-CX alloy, as the parent material using FEA boundary modes analysis, and are summarized in the plots of FIGS. 6A-6E. The dispersion for the real and imaginary parts of the wave vector for empty voids in the metamaterial is summarized in graphs 600 and 610 of FIGS. 6A and 6B, respectively.

Figure 6A:
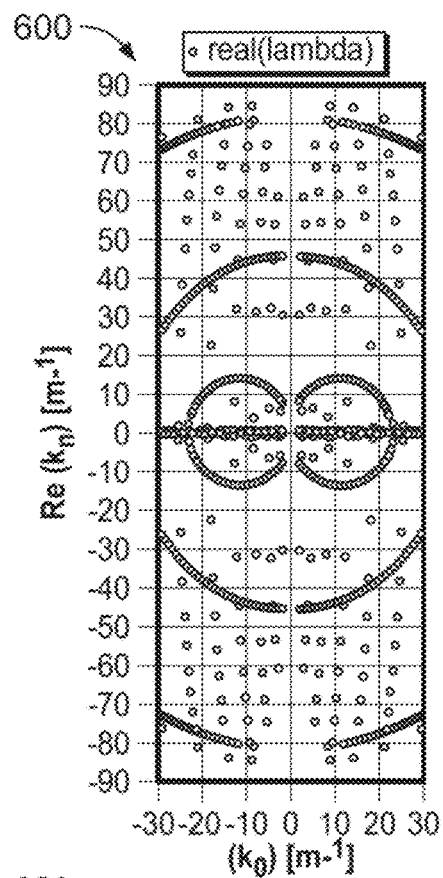
FIGS. 6A-6D are graphical representations of frequency dispersion characteristics for a particular metamaterial formed in example bar configurations that represent at least a portion of a vibration isolator according to the present disclosure.
Figure 6B:
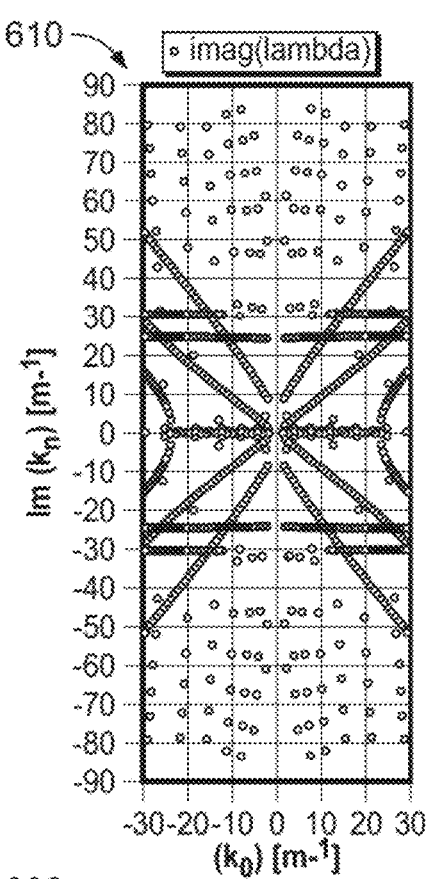

The empty void dispersion exhibits that the loss component (Im[k]) of the wave vector undergoes a hyperbolic response indicating significant damping across the wavelength range, despite the lightly damped intrinsic material properties of the alloy, as shown in FIG. 6B. In contrast, the propagation component (Re[k]) is characterized by circular type closed contours as shown in FIG. 6A. The narrow band response of the series of high absorption resonances is evidenced with the discontinuities scattered from the circular and hyperbolic dispersions, an artifact of the decoupled state between many of the series of near perfect absorption resonances in the empty void metamaterial.

Figure 6C:
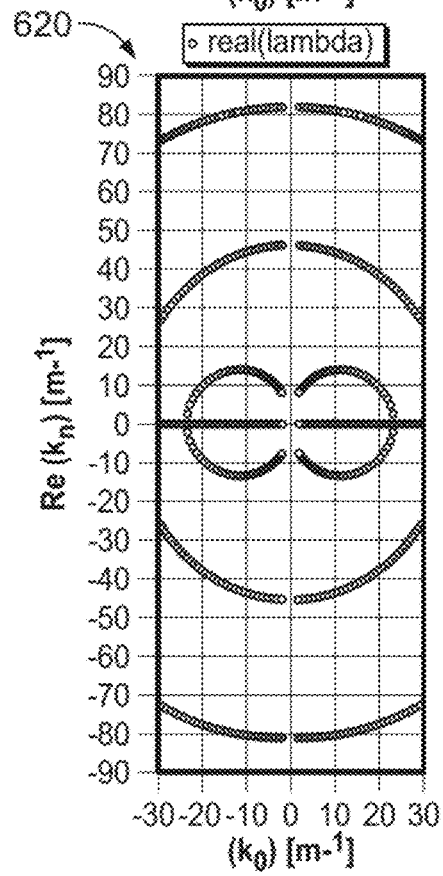
Figure 6D:
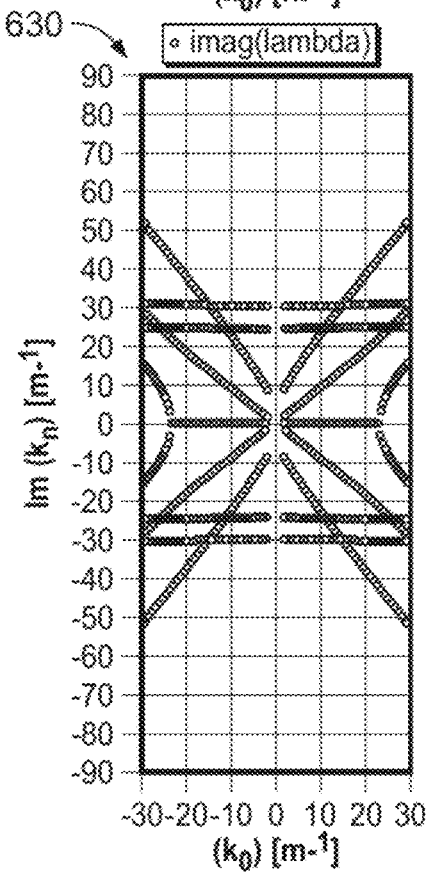

The effect of integrating a viscoelastic potting in the metamaterial voids is shown in the real and imaginary component graphs 620 and 630 of FIGS. 6C and 6D, respectively. Integration of the viscoelastic filling, in some aspects, has the effect of more strongly coupling the series of near perfect absorption resonances and compounding the absorption magnitudes to form broadband high absorption over the frequencies evaluated. The resonance coupling mechanism is associated with motion of the subwavelength resonators features that generates interlaminar shear strains in the viscoelastic material leading to additional dissipation. This couples the characteristic high absorption resonances in the empty void configuration to develop a more distinctive hyperbolic dispersion in the loss component (lm[k]) of the wave vector as shown in FIG. 6D.

Figure 6E:
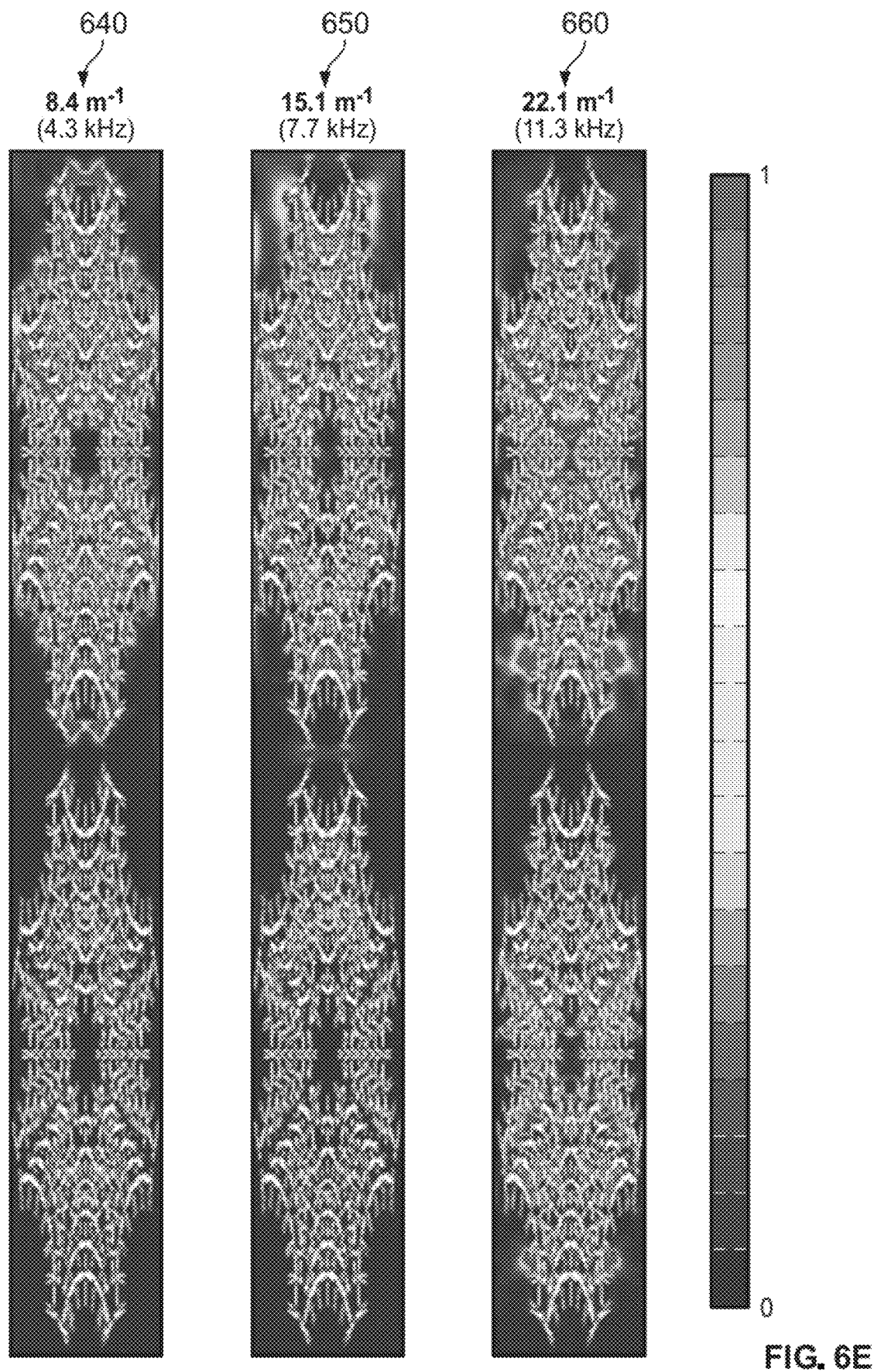
FIG. 6E shows a graphic representation of energy dissipation of a particular bar configuration of FIGS. 6A-6D.

The energy dissipation due to heating of the metamaterial for the empty void configuration at three specific resonances under axial excitation is described in the contour graphs 640, 650, and 660 of FIG. 6E. At the lower frequencies, the dissipation is concentrated more within the leading metamaterial cell, while at the higher frequency both cells contribute significantly. Thus, in some aspects, a length of the vibration isolator 100 can have an effect on vibration absorption at higher frequencies.

In some aspects, the elastic metamaterial 107 of the vibration isolator 100 can enable high levels of vibration dissipation over broad bandwidths while still able to sustain necessary load-bearing capabilities as part of the drill string 17. This type damping capacity emerging from structurally stiff components has been described as "metadamping" to distinguish from narrowband phenomena in flexible structures. A measure of the dissipation emergence function can be made through comparison of the absorption spectra of the load bearing structure with that of the statically equivalent model, as illustrated in the graphs 700 and 720 of FIGS. 7A and 7B, respectively. For example, graph 700 (which includes y-axis of vibration absorption and x-axis of frequency) compares the absorption spectra of the elastic metamaterial design having viscoelastic filling material in the cellular cavities with that of the statically equivalent prismatic bar model absorption spectrum. Curve 702 represents the absorption spectra of the elastic metamaterial while curve 704 represents the statically equivalent prismatic bar model absorption spectrum. A similar comparison is shown in graph 720 (which includes y-axis of vibration absorption and x-axis of frequency) of FIG. 7B for the elastic metamaterial design with empty voids in the cellular cavities. Curve 722 represents the absorption spectra of the elastic metamaterial while curve 724 represents the statically equivalent prismatic bar model absorption spectrum.

The grey-filled region intermediate the two spectrum curves (for example, between curves 702 and 704 in graph 700 and between curves 722 and 724 in graph 720) in each plot is a measure of the metadamping emergence developed by the metamaterial. The statically equivalent model is based on isotropic moduli but anisotropic Poisson ratio to match the metamaterial statics. The statically equivalent model has static sound speed $c_0$=2275 m/sec, and mass density $\rho_0$=5.8 g/cc. The graph 700 illustrates a broad bandwidth absorption spectrum characterized by highly coupled near perfect absorption bandwidths in the frequency range up to 13 kHz. The graph 720 illustrates that even without the viscoelastic filling material, significant metadamping emergence is developed by a continuous series of near perfect absorption narrowband resonances in the bare metamaterial with empty cavities.

The absorption capacity of the elastic metamaterial 107 under transverse as well as axial loading conditions can be of interest for the potential downhole applications, since the vibration isolator 100 is installed in the drill string 17. The absorption characteristics under transverse (X-axis wave modes) loading was evaluated for an example elastic metamaterial, specifically, ToughMet metamaterial with viscoelastic filled metamaterial voids as well as empty voids, similarly as for axial loading conditions. The cavity filled absorption spectrum is shown in graph 800 of FIG. 8A, with the empty void case shown in graph 820 of FIG. 8B for comparison. The graph 800 (which includes y-axis of vibration absorption and x-axis of frequency) illustrates a similar broad bandwidth absorption spectrum as with axial loading, but characterized by three discernible regions of coupled high absorption bandwidths in the frequency range up to 15 kHz. The spectrum shows generally lower levels of absorption in the low frequency range compared to the axial loading case, but significantly increased absorption in the higher frequency range 12-15 kHz. Curve 802 represents the absorption spectra of the elastic metamaterial while curve 804 represents the statically equivalent prismatic bar model absorption spectrum.

The graph 820 (which includes y-axis of vibration absorption and x-axis of frequency) illustrates similarly as with axial loading that even without the viscoelastic cellular material significant metadamping emergence is developed by a continuous series of high absorption narrowband resonances in the bare metamaterial with empty voids. Curve 822 represents the absorption spectra of the elastic metamaterial while curve 824 represents the statically equivalent prismatic bar model absorption spectrum.

Studies were conducted to determine the effects of changing the anisotropy factor Rxy as shown in FIG. 4C. In the simulations, the number of metamaterial cells was changed to maintain a consistent length of the attenuation section of the vibration isolator 100. The simulations were conducted using the ToughMet alloy metamaterial with viscoelastic filled metamaterial voids. The results of the simulation trade study indicates that an anisotropy factor Rxy=4 was optimum for the range analyzed (2<Rxy<4). Comparison of the reflection and transmission spectra against the absorption spectra shows that the metamaterial geometry Rxy=2, N=4 exhibits the most significant attenuation of transmission T($\omega$), but predominantly from reflection R($\omega$) with the least magnitude of absorption across the spectrum excluding the bandwidth about 9 kHz.

Figures 9A, 9B:
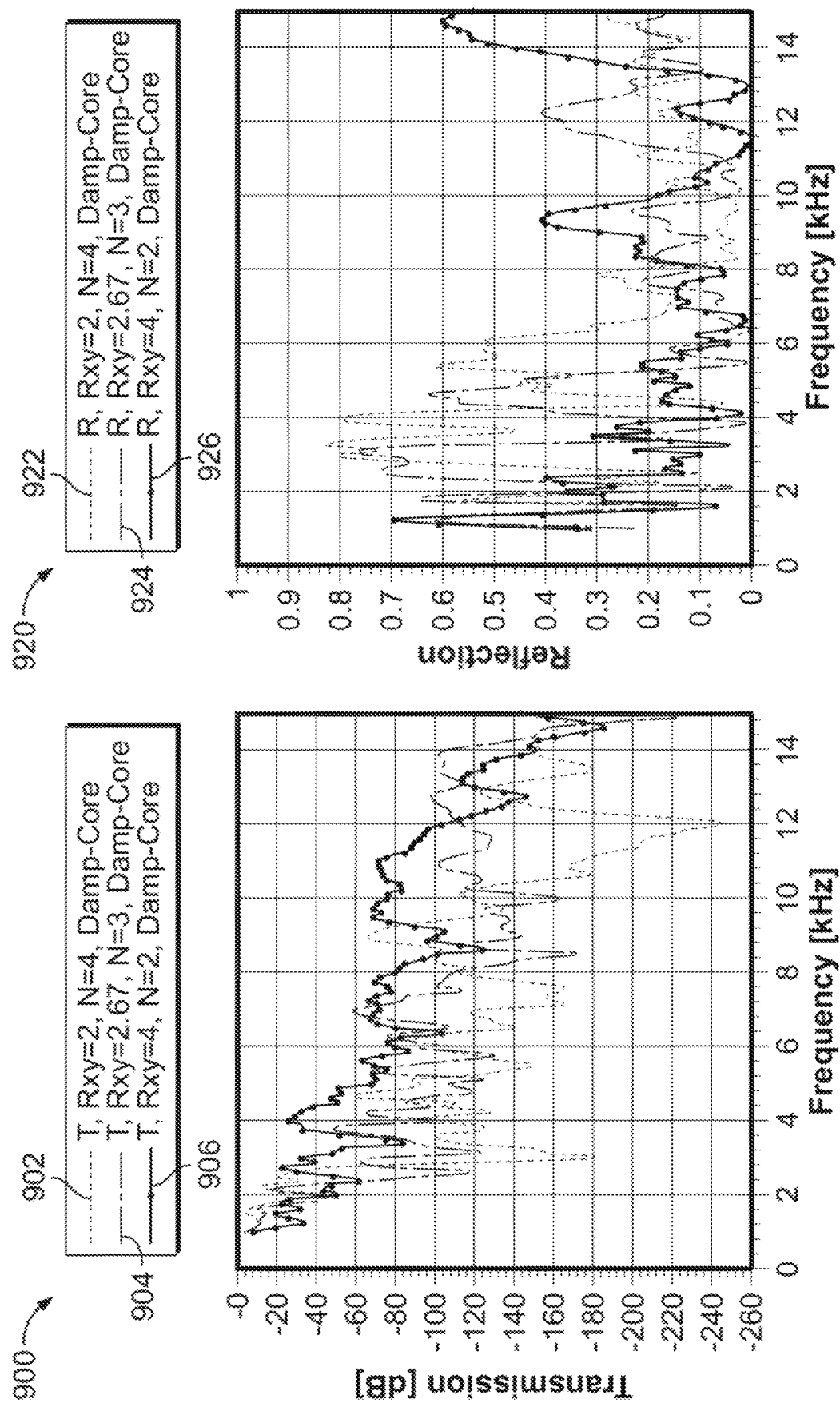

FIGS. 9A-9C are graphs that illustrate scattering parameters retrieval spectra for the ToughMet alloy metamaterial with viscoelastic filled voids for different anisotropy factors according to the simulations. The total length of the metamaterial section (of the vibration isolator 100) remained consistent between the anisotropy factors simulations. FIG. 9A illustrates graph 900 which includes y-axis of absorption and x-axis of frequency and shows transmission (T($\omega$)) curves. Curve 902 represents an anisotropy factor Rxy of 2; curve 904 represents an anisotropy factor Rxy of 2.67; and curve 906 represents an anisotropy factor Rxy of 4. FIG. 9B illustrates graph 920 which includes y-axis of reflection and x-axis of frequency and shows reflection (R($\omega$)) curves. Curve 922 represents an anisotropy factor Rxy of 2; curve 924 represents an anisotropy factor Rxy of 2.67; and curve 926 represents an anisotropy factor Rxy of 4. FIG. 9C illustrates graph 930 which includes y-axis of absorption and x-axis of frequency and shows absorption curves. Curve 932 represents an anisotropy factor Rxy of 2; curve 934 represents an anisotropy factor Rxy of 2.67; and curve 936 represents an anisotropy factor Rxy of 4.

In some aspects, the geometric features of the elastic metamaterial design for the vibration isolator 100 can allow for both conventional manufacturing as well three-dimensional (3D) additive manufacturing (AM) techniques. Several AM metal alloys compatible with downhole environments can be implemented as the elastic metamaterial 107 of the vibration isolator 100 and can be utilized in a significant portion of the fabrication for structural components downhole. The absorption characteristics of two example metamaterials that can be used for downhole components, Inconel-718 and Ti6Al4V, were evaluated. In this example, both materials were evaluated based on selective lase melting (SLM) fabrication properties. The same damping factor was assumed for each metallic material in the simulations as shown in FIG. 5C (ξ=2.5% @ 1 kHz, ξ=0.2% @ 15 kHz).

Figures 10A, 10B:
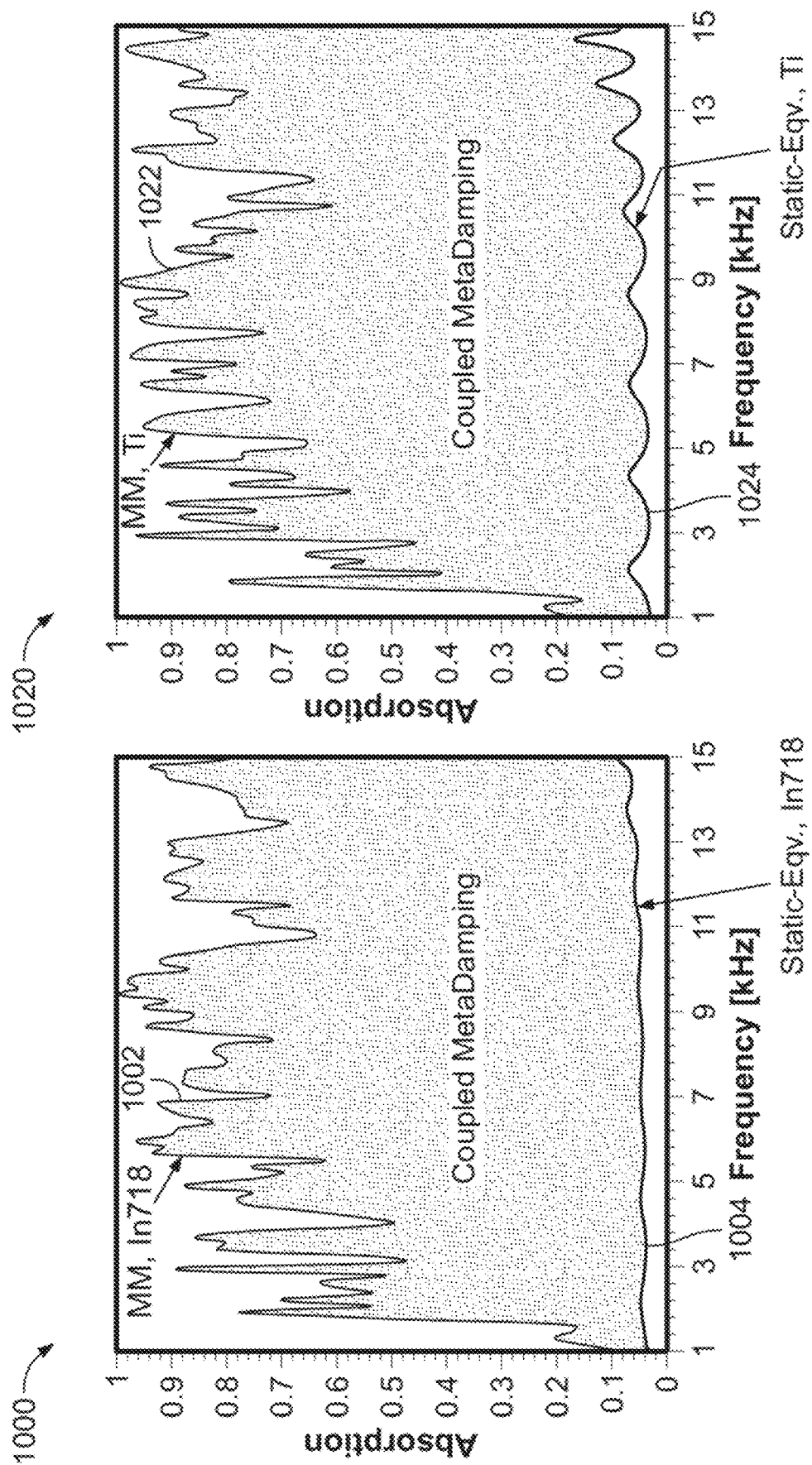
FIGS. 10A and 10B are graphs that show absorption characteristics under axial loading for the metamaterial using two different example parent materials that can be used to form at least a portion of a vibration isolator according to the present disclosure.

The analyses included the effect of filling the metamaterial voids with a viscoelastic material (as described previously with the ToughMet alloy metamaterial). The absorption characteristics under axial (Y-axis wave modes) loading for the SLM Inconel-718 material properties is shown in graph 1000 of FIG. 10A, with the spectrum for SLM Ti6A14V AM properties shown in graph 1020 of FIG. 10B. The spectra in these graphs 800 and 820 reveal that both these sets of AM material properties provide broadband high absorption spectra as with the ToughMet 2-CX properties, with the SLM Ti6A14V material properties exhibiting slightly better absorption over the span of the frequency range than the other two materials evaluated (SLM Inconel-718 and ToughMet). In graph 1000, curve 1002 represents the metamaterial characteristics while curve 1004 represents the statically equivalent prismatic bar model absorption spectrum. In graph 1020, curve 1022 represents the metamaterial characteristics while curve 1024 represents the statically equivalent prismatic bar model absorption spectrum.

In some aspects, an applicability of an elastic metamaterial 107 for downhole use in the vibration isolator 100 can be affected by its load bearing capacity. A bilinear elastic-plastic FEA was utilized to quantify the axial load capacity of the metamaterial in the SLM Ti6A14V alloy having a yield strength of 945 MPa and 13% elongation at 1100 MPa ultimate tensile strength. The load-strain response curve 1102 (in graph 1100 with y-axis of applied load and x-axis of equivalent section strain) of the elastic metamaterial SLM Ti6Al4V alloy is shown in FIG. 11 for loading up to 500 kN (110 kip). The results of the analysis indicate an effective yield condition 1104 (at 0.1% offset) at 220 kN (50 kip). A 40% reduction in tangent stiffness occurs at 435 kN (98 kip) axial loading, well within the load accumulation range of the metamaterial bar. For reference, typical wireline logging applications specify requirements for axial loading capacity of a downhole tool string at 180 kN (40 kip), indicating good strength margin in this elastic metamaterial 107 used in the vibration isolator 100 for these type applications.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A wellbore drilling system, comprising:
   a drill string coupled to a drilling rig and comprising a plurality of drill pipe joints;
   a bottom hole assembly (BHA) coupled to the drill string and comprising a drill bit configured to form a wellbore from a terranean surface into one or more subterranean formations through operation of the drilling rig to rotate the drill string and BHA; and
   a vibration isolator coupled within the drill string between the BHA and an acoustic telemetry source, the vibration isolator comprising an elastic metamaterial configured to absorb mechanical energy vibrations generated through operation of the drilling rig to rotate the drill string and BHA, the elastic metamaterial formed in a specified geometry that comprises a plurality of voids, the specified geometry based on a transformation of a set of Rhodonea conformal mapping contours.

2. The wellbore drilling system of claim 1, wherein the vibration isolator further comprises a viscoelastic material that fills at least some of the plurality of voids.

3. The wellbore drilling system of claim 1, wherein the elastic metamaterial is formed in the specified geometry with an additive manufacturing process.

4. The wellbore drilling system of claim 1, wherein the elastic metamaterial comprises at least one of ToughMet-2-CX, SLM Inconel-718, or SLM Ti6Al4V.

5. The wellbore drilling system of claim 1, wherein the mechanical energy vibrations comprise:
   a first portion of mechanical energy vibrations generated from the drill bit that propagate in an uphole direction; and
   a second portion of mechanical energy vibrations generated from the acoustic telemetry source that propagate in a downhole direction.

6. The wellbore drilling system of claim 1, wherein the elastic metamaterial comprises a metadamping elastic metamaterial.

7. The wellbore drilling system of claim 6, wherein the metadamping elastic metamaterial is configured to suppress vibration through absorption of mechanical energy generated by the drill string in a passband frequency range of between 500-2000 Hz.

8. A method of forming a wellbore, comprising:
operating a wellbore drilling system to form a wellbore from a terranean surface into one or more subterranean formations, the operating comprising:
  operating a drilling rig on the terranean surface to rotate a drill string coupled to the drilling rig and comprising a plurality of drill pipe joints, and
  rotating a drill bit of a bottom hole assembly (BHA) coupled to the drill string to form the wellbore; and
during operation of the wellbore drilling system, absorbing mechanical energy vibrations generated through operation of the drilling rig to rotate the drill string and BHA with an elastic metamaterial of a vibration isolator coupled within the drill string between the BHA and an acoustic telemetry source, the elastic metamaterial formed in a specified geometry that comprises a plurality of voids, the specified geometry based on a transformation of a set of Rhodonea conformal mapping contours.

9. The method of claim 8, wherein the vibration isolator further comprises a viscoelastic material that fills at least some of the plurality of voids.

10. The method of claim 8, wherein the elastic metamaterial is formed in the specified geometry with an additive manufacturing process.

11. The method of claim 8, wherein the elastic metamaterial comprises at least one of ToughMet-2-CX, SLM Inconel-718, or SLM Ti6Al4V.

12. The method of claim 8, comprising:
by operation of the wellbore drilling system, generating a first portion of mechanical energy vibrations from the drill bit that propagate in an uphole direction;
absorbing at least some of the first portion of mechanical energy vibrations with the elastic metamaterial;
by operation of the wellbore drilling system, generating a second portion of mechanical energy vibrations from the acoustic telemetry source that propagate in a downhole direction; and
absorbing at least some of the second portion of mechanical energy vibrations with the elastic metamaterial.

13. The method of claim 12, comprising dissipating at least some of the absorbed first and second portions of mechanical energy vibrations as heat.

14. The method of claim 8, wherein the elastic metamaterial comprises a metadamping elastic metamaterial.

15. The method of claim 14, comprising suppressing, with the metadamping elastic metamaterial, vibration through absorption of mechanical energy generated by the drill string in a passband frequency range of between 500-2000 Hz.

16. A drill string vibration isolator, comprising:
a top connector configured to couple to a portion of a drill string;
a bottom connector configured to couple to another portion of the drill string;
a housing; and
at least one elastic metamaterial configured to absorb mechanical energy vibrations generated through operation of a drilling rig to rotate the drill string and operation of an acoustic telemetry source to transmit downhole data to a terranean surface, the at least one elastic metamaterial formed in a specified geometry that comprises a plurality of voids, the specified geometry based on a transformation of a set of Rhodonea conformal mapping contours.

17. The drill string vibration isolator of claim 16, wherein the vibration isolator further comprises a viscoelastic material that fills at least some of the plurality of voids.

18. The drill string vibration isolator of claim 16, wherein the elastic metamaterial is formed in the specified geometry with an additive manufacturing process.

19. The drill string vibration isolator of claim 16, wherein the at least one elastic metamaterial comprises at least one of ToughMet-2-CX, SLM Inconel-718, or SLM Ti6Al4V.

20. The drill string vibration isolator of claim 16, wherein the mechanical energy vibrations comprise:
a first portion of mechanical energy vibrations generated from the drill bit that propagate in an uphole direction; and
a second portion of mechanical energy vibrations generated from the acoustic telemetry source coupled to the drill string that propagate in a downhole direction.

21. The drill string vibration isolator of claim 20, wherein the vibration isolator is configured to couple within the drill string between the drill bit and the acoustic telemetry source.

22. The drill string vibration isolator of claim 16, wherein the elastic metamaterial comprises a metadamping elastic metamaterial.

23. The drill string vibration isolator of claim 22, wherein the metadamping elastic metamaterial is configured to suppress vibration through absorption of mechanical energy generated by the drill string in a passband frequency range of between 500-2000 Hz.

\* \* \* \* \*